United States Patent [19]

Han et al.

[11] Patent Number: 5,378,404
[45] Date of Patent: Jan. 3, 1995

[54] PROCESS FOR FORMING DISPERSIONS OR SOLUTIONS OF ELECTRICALLY CONDUCTIVE CONJUGATED POLYMERS IN A POLYMERIC OR LIQUID PHASE

[75] Inventors: Chien-Chung Han, Madison; Lawrence W. Shacklette, Maplewood, both of N.J.

[73] Assignee: AlliedSignal Inc., Morristownship, Murros County, N.J.

[21] Appl. No.: 63,814

[22] Filed: May 20, 1993

Related U.S. Application Data

[63] Continuation-in-part of Ser. No. 689,382, Apr. 22, 1991, abandoned, and a continuation-in-part of Ser. No. 751,915, Aug. 29, 1991, abandoned.

[51] Int. Cl.$^6$ ............................................. H01B 1/00
[52] U.S. Cl. ...................................... 252/500; 252/518; 524/157; 524/158; 525/540; 528/422; 528/480; 528/502; 528/503
[58] Field of Search ............. 252/500, 518; 524/157, 524/158; 525/540; 528/422, 480, 502, 503

[56] References Cited

U.S. PATENT DOCUMENTS

| | | | |
|---|---|---|---|
| 4,521,589 | 6/1985 | Yamamoto et al. | 528/380 |
| 4,711,742 | 12/1987 | Jen et al. | 252/500 |
| 4,798,685 | 1/1989 | Yaniger | 252/500 |
| 4,806,271 | 2/1989 | Yaniger et al. | 252/500 |
| 4,808,681 | 2/1989 | Harper et al. | 526/270 |
| 4,822,638 | 4/1989 | Yaniger | 252/500 |
| 4,851,487 | 7/1989 | Yaniger et al. | 252/500 |
| 4,855,361 | 8/1989 | Yaniger et al. | 252/500 |
| 4,900,782 | 2/1990 | Han et al. | 525/398 |
| 4,940,517 | 7/1990 | Wei | 528/422 |
| 4,940,640 | 7/1990 | MacDiarmid | 528/422 |
| 4,983,322 | 1/1991 | Elsenbaumer | 250/500 |
| 5,006,278 | 4/1991 | Elsenbaumer | 252/500 |
| 5,068,060 | 11/1991 | Jen et al. | 252/500 |
| 5,227,092 | 7/1993 | Han | 252/500 |
| 5,232,631 | 8/1993 | Cao et al. | 252/500 |

FOREIGN PATENT DOCUMENTS

| | | |
|---|---|---|
| 0361429 | 4/1990 | European Pat. Off. . |
| 0432929 | 6/1991 | European Pat. Off. . |
| WO8800954 | 2/1988 | WIPO . |
| 89/01694 | 2/1989 | WIPO . |
| 90/01775 | 2/1990 | WIPO . |
| 90/10297 | 9/1990 | WIPO . |
| 91/06887 | 5/1991 | WIPO . |

OTHER PUBLICATIONS

A. F. M. Barton, "Handbook of Solubility Parameters and Other Cohesion Parameters", 2nd. ed., CRC Press, 1991 (no month).

"CRC Handbook of Chemistry and Physics", CRC Press. (1982) (no month).

"Polymer Handbook", ed. by J. Brandrup & E. H. Immergut, Wiley Interscience Publication, John Wiley & Sons (Third Edition) (No date).

H. H. Wieder, "Laboratory Notes on Electrical and Galvanomagnetic Measurements", Elsevier Scientific Publishing, New York, 1979 no month.

Green et al., "Aniline Black and Allied Compounds", Part II, J. Chem. Soc., 101, p. 1117, (1912) no month.

Kobayashi et al, "Electrochemical Reactions Concerned with Electrochromism of Polyaniline Film-Coated Electrodes", J. Electroanal. Chem, 177, pp. 281–291, no date.

Shacklette et al., "Structure and Properties of polyaniline as modeled by single-crystal oligomers", J. Chem. Phys., 88, p. 3955 (1988) no month.

T. A. Skotheim, "Handbook of Conducting Polymers", Marcel Dekker, Inc., Dept. of Applied Science, Brookhaven Nat. Laboratory, Upton, N.Y. (no date).

Primary Examiner—Anthony Green
Attorney, Agent, or Firm—Karen A. Harding; Roger H. Criss

[57] ABSTRACT

This invention relates to a process of forming liquid or solid blends, solutions, or dispersions of electrically conductive doped conjugated polymer dissolved or dispersed in a liquid or polymeric matrix.

13 Claims, 1 Drawing Sheet

PROCESS FOR FORMING DISPERSIONS OR SOLUTIONS OF ELECTRICALLY CONDUCTIVE CONJUGATED POLYMERS IN A POLYMERIC OR LIQUID PHASE

RELATED APPLICATIONS

This application is a continuation-in-part application of U.S. Ser. No. 689,382, filed Apr. 22, 1991 now abandoned, and U.S. Ser. No. 751,915, filed Aug. 29, 1991, now abandoned.

FIELD OF INVENTION

This invention relates to a process for forming an electrically conductive solution or dispersion of electrically conductive conjugated polymers in a liquid or polymeric matrix phase. This invention also relates to the electrically conductive solutions or dispersions prepared by the process of this invention and to conductive blends or composites prepared from said conductive solutions or dispersions, such as conductive parts, films, coatings, fibers, paints, and inks.

BACKGROUND OF INVENTION

There has recently been an increased interest in the electrochemistry and electrical phenomena of polymeric systems. Recently, work has intensified with backbone polymers having extended conjugation in at least one backbone chain. See for example, U.S. Pat. Nos. 4,855,361; 4,798,685; 4,806,271; 4,822,638; 4,851,487; and 4,798,685; and PCT WO89/01694.

SUMMARY OF INVENTION

This invention relates to a process of forming an electrically conductive blend, solution or dispersion comprising a substituted or unsubstituted electrically conductive conjugated polymer dissolved or dispersed in a liquid or polymeric matrix, said process comprises the steps of:

selecting a matrix liquid or a matrix polymer for the blend, solution, or dispersion, said matrix liquid or matrix polymer having a first solubility parameter;

doping a substituted or unsubstituted conjugated polymer having a second solubility parameter, which is incompatible with said selected matrix liquid or matrix polymer with at least one dopant solute to modify the solubility parameter or surface energy of said conjugated polymer to enhance the compatibility of said conjugated polymer and said selected matrix liquid or matrix polymer to make the said second solubility parameter of said conjugated polymer closer the said first solubility parameter of said matrix liquid or said matrix polymer; and dissolving, dispersing, or blending said doped conjugated polymer in said liquid matrix or polymer matrix to form said electrically conductive solution, dispersion, or blend.

Another aspect of this invention relates to a process of forming an electrically conductive solid or liquid dispersion comprised of doped electrically conductive particles of a conjugated polymer dispersed in a liquid matrix or polymeric matrix, said process comprising the steps of:

selecting a liquid matrix or polymer matrix having a first solubility parameter;

doping particles of a conjugated polymer having a second solubility parameter, which polymer is incompatible with said selected liquid matrix or polymer matrix to form electrically conductive particles comprising an ionized electrically conductive conjugated polymer (polymer cation) doped with one or more dopant solutes (anions), and where at least one dopant solute predominates at or near the surface of said particles modifying the solubility parameter or the surface energy of said surface with said selected matrix or matrix polymer to make the second solubility parameter of said conjugated polymer at or near the surface of said polymer closer to the said first solubility parameter of said matrix liquid or matrix polymer; and dispersing or dissolving said particles in said selected liquid matrix or polymer matrix to form said liquid or solid dispersion.

In either aspect of this invention, the dopant or dopants intended to enhance the compatibility of said conductive polymer in said liquid or polymeric matrix may be optionally first incorporated, all or in part, within the matrix liquid or polymer in the form of an acid, salt, or ester which may subsequently react with the conductive polymer during or after the process of dispersing, dissolving, or blending said conductive polymer in said matrix.

As used herein, "at or near the surface of the particle" is all or a portion of the surface of said particles to a depth of about 5 nanometers (nm); and "at or near the core of said particle" is all or a portion of the particle more than about 3 nanometers (nm) from the surface of the particle. As used herein, a "solution" is a real solution or an ultrafine dispersion having an average particle size of less than about 100 nanometer. As used herein, "incompatible" means that the conductive polymer in its given state does not form real liquid or solid solutions as defined above.

BRIEF DESCRIPTION OF THE DRAWINGS

In the accompanying drawings.

DESCRIPTION OF THE PREFERRED EMBODIMENTS

In the first step of the process of this invention, a liquid or polymer is selected to form the liquid or polymeric matrix. The liquid or polymer has a solubility parameter. As used herein, "solubility" parameter ($\delta$), which is also known as the Hildebrand parameter, is the square root of the cohesive energy density of the liquid or solid. The solubility parameter of useful liquids or polymers may be determined by any suitable means. For example, solubility parameters can be obtained from suitable handbooks. The solubility parameter can also be determined through use of conventional theoretical or empirical methods as for example through calculation by group contribution methods, or through measuring the degree of interaction with other liquids or solids with known solubility parameters. The solubility parameter can also be related to the surface free energy, or surface tension (y), of the liquid or solid. Such surface energy can also be used to characterize the matrix material. A better and more complete description of the matrix is made by determining specific contributions to the solubility parameter or surface energy as can be done, for example, by the Hansen Method, as found in "Handbook of Solubility Parameters and Other Cohesion Parameters" 2nd ed. (by A. F. M. Barton; CRC Press, 1991 ), wherein the solubility parameter is expressed according to dispersive ($\delta_d$), polar ($\delta_p$), and hydrogen bonding ($\delta_h$) contributions where $\delta = (\delta_d^2 + \delta_p^2 + \delta_h^2)^{\frac{1}{2}}$. An analogous expression for the surface energy is $y = y_d + y_p + y_h$.

Liquids useful in the practice of this invention may vary widely. The only requirement is that the liquid is capable of dissolving or dispersing the required quantity of electrically conductive conjugated backbone polymer. Preferred liquids have dielectric constants measured at room temperature (i.e. 10°-30° C.) equal to or greater than 2.2. Illustrative of such useful liquids are water; dimethylsulfoxide; hydrocarbons such as hexane, decane, decalin, toluene, xylene, benzene; amides such as formamide, acetamide, N,N-dimethyl formamide, N,N-dimethyl acetamide, N-methyl pyrrolidinone, pyrrolidinone, and the like; alcohols and glycols such as methanol, ethanol, propanol, butanol, pentanol, hexanol, octanol, glycol, glycerol, propanediol, benzyl alcohol, cresol, phenol, cyclohexanol, 2-methoxy ethanol, and the like; acids, such as formic acid, acetic acid, propionic acid, butyric acid, sulfuric acid, trifluoroacetic acid, pentafluoropropionic acid, perfluorobutyric acid, phosphoric acid, phosphonic acid, sulfonic acid, and the like; ketones, such as acetone, 2-butanone, 3-pentanone, cyclohexanone, 2,4-pentadione, acetophenone, benzophenone, methylethylketone, methylisobutylketone, and the like; amines, such as methylamine, dimethylamine, dipropylamine, triethylamine, dibenzyl amine, picoline, and the like; nitro compounds of aliphatic and aromatic hydrocarbons such as nitromethane, nitroethane, nitrobenzene, nitrotoluene, nitroaniline, tetranitromethane, and the like; nitriles such as acetonitrile and benzonitrile; halogenated aliphatic and aromatic hydrocarbons such as methylene chloride, chloroform, chloromethane, dibromoethylene, trichloroethane, chlorobenzene, o-difluorobenzene, bromotoluene and the like; esters such as methyl formate, ethyl acetate, ethyl acetoacetate, methyl benzoate, benzyl acetate, ethyl oleate, butyl stearate, methyl salicylate, dimethyl phthalate, and the like; ethers such as methyl ether, ethyl ether, phenyl ether, tetrahydrofuran, 1,4-dioxane, and the like; phosphates, such as tricresyl phosphate, and the like; and silicates such as tetraethylsilicate, and the like. More preferred liquids are those having a relative dielectric constant equal to or greater than about 3.0 such as water, amides, acids dimethyl sulfoxide, amines, alcohols, ketones, and nitrohydrocarbons. Particularly preferred liquids are those having a relative dielectric constant equal to or greater than about 4.0, such as amides, acids, dimethyl sulfoxide, amines, and alcohols. The most preferred liquid is an amide, such as substituted or unsubstituted pyrrolidinone.

Matrix polymers useful in the practice of this invention may also vary widely. Useful polymeric materials include epoxies, thermoset resins and thermoplastic polymers. Thermoset polymers for use in the practice of this invention may vary widely. Illustrative of such useful thermoset polymers are alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; amino resins such as those produced by addition reaction between formaldehyde and such compounds as melamine, urea, aniline, ethylene urea, sulfonamide and dicyandiamide; epoxies such as epoxy phenol novolak resins, diglycidyl ethers of bisphenol A and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-tolylene diisocyanate, 4,4-diphenylmethane diisocyanate, 1,6-hexamethylene diisocyanate and 4,4'-dicyclohexylmethane diisocyanate with a polyol such as polyether polyol (trimethylol propane, 1,2,6-hexanetriol, 2-methyl glycoside, pentaerythitol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols. In the case of two component epoxies, hydride-based curing agents are preferred over amine-based ones.

Thermoplastic polymers for use in the formulation of the composition of this invention may vary widely. Illustrative of such polymers are polyesters such as poly(pivaloyl lactone), poly(caprolactone), poly(parahydroxybenzoate), poly(ethylene oxybenzoate), poly(ethylene isophthalate), poly(ethylene terephthalate), poly(butylene terephthalate), poly(ethylene terephthalate glycol), poly(1,4-cyclohexane dimethylene terephthalate), poly (ethylene-1,5-naphthalate), poly (ethylene-2,6-naphathalate) and the like; polyamides such as poly(4-aminobutyric acid) (nylon 4), poly(6-aminohexanoic acid) (nylon 6), poly( 11 -aminoundecanoic acid) (nylon 11), poly(hexamethylene adipamide) (nylon 6,6), poly(hexamethylene sebacamide), (nylon 6, 10), poly[bis(4-aminocyclohexyl)-methane-1,10-decanedicarboxamide ](Quiana)(trans), poly(metaphenylene isophthalamide) (Nomex), poly(p-phenylene terephthalamide) (Kevlar), and the like; polyethers such as polyethylene oxide; polycarbonates such as poly[methane bis(4-phenyl)carbonate], poly[1,1-ethane bis(4-phenyl)carbonate], poly[4,4-heptane bis(4-phenyl)carbonate], poly [1,1-(1-phenylethane)bis(4-phenyl)carbonate], poly[diphenylmethane bis(4-phenyl)carbonate], poly[1,1-cyclohexane bis(4-phenyl) carbonate], poly[thio bis(4-phenyl)carbonate], poly [2,2-propane bis-[4-(2-methyl phenyl)]carbonate], poly [2,2-propane bis-[4-(2-chlorophenyl)]carbonate], and the like; polymers derived from the polymerization of $\alpha,\beta$-unsaturated monomers such as polyethylene, acrylonitrile/butadiene/styrene terpolymer, polypropylene, poly(4-methyl-1-pentene), polyisobutylene, poly(isoprene), 1,2-poly(1,3-butadiene), polystyrene, poly(vinyl chloride), poly(vinylidene fluoride), poly(vinylidene chloride), poly(tetrafluoroethylene) (Teflon), poly(chlorotrifluoroethylene), poly(vinyl acetate), poly(vinyl alcohol), and copolymers thereof such as poly(ethylene vinyl acetate), poly(ethylene vinyl alcohol), poly(ethylene acrylic acid), and the like, poly(methyl acrylate), poly(ethyl acrylate), poly(methyl methacrylate), poly(ethyl methacrylate), polyacrylonitrile, polyacrylamide and the like; polydienes such as poly(1,3-butadiene) and the like; polyoxides such as poly [2,2-bis(chloromethyl)-trimethylene-3-oxide](penton), poly(2,6-dimethyl-1,4-phenylene oxide) (PPO), poly(2,6-diphenyl-1,4-phenylene oxide) (Texax, P30) and the like; polysulphides such as poly(phenylene sulphide) and the like; polysulfones such as poly[4,4'-isopropylidene diphenoxy di(4-phenylene) sulphone]; Noryl ®, and mixtures thereof.

In the preferred embodiments of the invention, the non-conductive homopolymer or copolymer is a thermoplastic homopolymer or copolymer. Preferred thermoplastic polymers are polyamides, polyesters, poly(carbonates), poly(a-olefins), poly(vinyl halides), and copolymers and terpolymers, such as poly(ethylene terephthalate copolymer and glycol), acrylonitrile-/butadiene/styrene terpolymer. More preferred thermoplastic homopolymer or copolymers are polyamides, polycarbonates, polyesters and poly(α-olefins), and most preferred thermoplastic polymers and copolymers are poly(ethylene terephthalate glycol), nylon-12, polyethylene, polypropylene ethylene vinyl acetate (EVA) copolymer, ethylene vinyl alcohol (EVOH) copolymer, ethylene acrylic acid (EAA) copolymer, and polystyrene.

In the second step of the process of this invention a conjugated polymer which is incompatible with the selected matrix liquid or matrix polymer is doped with a dopant which modifies the solubility parameter of said conjugated polymer to enhance the compatibility between the doped conjugated polymer and the matrix liquid or matrix polymer. As used herein, "compatibility" refers to the extent to which the dopant and the environment or matrix are compatible and include meeting one or more of the following criteria: closely matching the solubility parameters and surface energies, including the Hansen component values of the particle and the matrix; obtaining low chemical reactivity between the particle and the matrix or other medium with which the particle will come in contact; and matching dispersive, polar or hydrogen bonding interactions which will lead to the facile dispersion of the particles in the matrix. The degree of compatibility can be assessed by determination of the minimum average particle size achievable for the conductive polymer dispersed in the matrix. A small average particle size i.e. equal to or less than 100 nanometers, is indicative of relative compatibility. Full compatibility is indicated by the formation of a true solution or miscible blend. As used herein "incompatible" is the opposite of compatible and refers to having a mismatched surface energy or a chemical reactivity toward the matrix or the environment in which the doped polymer is dissolved or dispersed. While we do not wish to be bound by any theory, it is believed that when the conjugated polymer is doped with a dopant or combination of dopants, the portion of the dopant(s) which is more compatible with the matrix liquid or polymer than the conjugated polymer projects away from the conjugated polymer and renders the combination of dopant and doped conjugated polymer more compatible with the matrix liquid or polymer than the more undoped conjugated polymer.

An important requirement for the dopants is that they have a desired set of averaged solubility parameters which will modify, after coupling to said conjugated polymer via the doping interaction, the solubility parameters of said doped conducting polymer to establish a relationship to the solubility parameters of said solvent or solvent mixture to render said conductive polymer soluble or dispersible in said liquid solvent, solvent mixture, solid polymer, polymer "melt" or polymer solution to the desired extent. The resultant solubility parameter of the doped conjugated backbone is approximated by the volume fractional sum of the solubility parameters of the individual components(i.e. the neutral conjugated backbone polymer and the dopant or dopants), as expressed in the following equation:

$$\delta = \Sigma \, \phi_i \delta_i = \Sigma \left( \frac{X_i V_i}{\overline{X_i V_i}} \right) \delta_i$$

wherein:
$\Phi_i$ is the volume fraction of the i-th component;
$\delta_i$ is the solubility parameter of the i-th component;
$X_i$ is the molar fraction of the i-th component; and
$V_i$ is the molar volume of i-th component.

The molar volume of the i-th component is equal to the ratio of the molecular weight of the i-th component to the density of the i-th component.

The value for solubility parameters of the i-th component ($\delta_i$) can be found in the Handbook of Chemistry and Physics CRC Press, 67th ed. 1986 and "Handbook of Solubility Parameters and Other Cohesion Parameters" 2nd ed. (by A. F. M. Barton; CRC Press, 1991) and "Polymer Handbook" (edited by J. Brandrup and E. H. Immergut; John Wiley & Sons, 1989).

Useful methods to estimate the solubility parameter of the i-th component are the group contribution or empirical methods as disclosed in the previously mentioned three handbooks.

In cases where one or more dopants predominate on the surface of a dispersed particle of the conductive polymer, the surface energy and effective solubility parameter of said particle will be dominated by the surface energy and solubility parameters characteristic of the part of the dopant which projects outward from the surface of said particle. In such an instance, the above described volume fraction approach would not be appropriate. The action of the dopant in this instance is better treated as that of a surfactant. Effective solubility parameters for the lipophilic substituents of common surfactants are tabulated in "Handbook of Solubility Parameters and Other Cohesion Parameters" 2nd ed. (A. F. M. Barton, CRC Press, 1991);

The solubility parameter of useful solvents can be determined by any suitable means. For example, solubility parameters can be obtained from suitable handbooks as for example the three handbooks mentioned hereinabove. The solubility parameter can also be determined through use of conventional methods as for example group contribution methods or empirical methods.

Whether forming solutions or dispersions, the dopant or dopants intended to enhance the compatibility of said conductive polymer in said liquid or polymeric matrix may be optionally first incorporated, all or in part, within the matrix liquid or polymer in the form of an acid, salt, or ester which may subsequently react with the conductive polymer during or after the process of dispersing, dissolving, or blending said conductive polymer in said matrix. In general, 0 to 100% or the dopant required to fully dope the conjugated conductive polymer may be incorporated in the liquid or polymeric matrix. Preferably from about 0 to 20%, more preferably form about 3 to 20%, and most preferably from about 5 to 15% of the required dopant is first incorporated in the matrix, and subsequently allowed to dope the conjugated polymer.

Conjugated polymers for use in the process of this invention may vary widely. As used herein "conjugated polymers" are homopolymers or copolymers which are comprised of alternating carbon-carbon double bonds (either singly or as part of an aromatic ring structure), and optionally heteroatoms such as oxygen, nitrogen, sulfur, selenium, phosphorous and the like along the polymer conjugated backbone or conjugated side chains thereof, and can be rendered to an electrically conductive state (equal to or greater than about $10^{-9}$ S cm$^{-1}$ as determined by the four-probe methods described in "Laboratory Notes on Electrical and Galvanometric Measurements" by H. H. Wieder, Elsevier Scientific Publishing Co., New York, N.Y., 1979) by doping with some dopants known in the art.

Illustrative of such polymers are poly(unsaturated) polymers such as substituted and unsubstituted polyacetylene; substituted or unsubstituted poly(heteroaromatics), such as poly(thienylenes), poly(pyrroles), poly(quinolines), poly(isothianaphthenes), poly(carbazoles), poly(alkyl thiophenes) and the like; substituted or unsubstituted poly(aromatics) such as poly(phenylene sulfides), poly(anilines), poly(phenylenes), poly(naphthalenes), poly(naphthols), and poly(perinaphthalenes); poly (benzoquinones); poly(azulenes); and substituted or unsubstituted poly(aromatic vinyleries) such as poly(phenylene vinylenes), poly(dimethoxyphenylene vinylenes), poly(naphthalene vinylenes) and the like; and substituted or unsubstituted poly(heteroaromatic vinylenes) such as poly(thienylene vinylenes), poly(furylene vinylenes), poly(carbazole vinylenes), poly(pyrrole vinylenes) and the like.

Preferred conjugated homopolymers or copolymers are "conjugated backbone homopolymers or copolymers". As used herein, "conjugated backbone homopolymers or copolymers" are conjugated homopolymers or copolymers in which all or substantially all of the conjugation is in the main backbone of the homopolymer or copolymer.

Preferred conjugated homopolymer or copolymers are substituted or unsubstituted polyanilines, poly(heterocycles), and aromatic or heteroaromatic vinylenes. Illustrative of preferred homopolymers or copolymers of poly(heterocycles), and aromatic or heteroamatic vinylenes are those described in more detail in U.S. Pat. Nos. 4,711,742 and 5,068,060 and PCTAN088/00954. More preferred for the practice of this invention are conjugated polymers which have relatively low acidity (pKa >2, preferably >4, and most preferably >6) and which are readily doped by protonic acids as for example, polyaniline, poly(benzoquinone), polypyrrole, and poly(carbazole).

More preferred conjugated backbone homopolymers or copolymers are polyanilines and polypyrroles. Most preferred polymers are polyanilines. As used herein, "polyanilines" are homopolymers or copolymers in which the recurring backbone monomeric units are selected from the group consisting of substituted or unsubstituted phenyl rings and amine linkages (—NH— or —NR— where R is a substituent other than hydrogen) which may contain varying amounts of substituted or unsubstituted quinoid rings and imine (—N—) linkages. As used herein, "neutral or undoped polyaniline" is characterized by an uncharged backbone, "polyaniline base" is a particular form of undoped polyaniline which contains at least one quinoid diimine linkage in the backbone and "electrically conductive or doped poly(aniline)" is characterized by a charged backbone which may be formed by a partial or complete protonation of the amine and/or imine nitrogen atoms. As used herein, "leuco polyaniline" is a neutral form of polyaniline which is in a reduced state (low oxidation state) and which comprises to a substantial degree phenyl rings linked by amine (—NH—) linkages. Such leuco-polyanilines are preferably doped with oxidizing dopants such as ferric salts.

Any form of such poly(anilines) can be conveniently used in the practice of this invention. Illustrative of useful forms are those described in Green, A. G. and Woodhead, A. E., CXVII-Aniline-black and Allied Compounds, Part II", *J. Chem. Soc.*, 101 pp. 1117 (1912) and Kobayashi, et al., "Electrochemical Reactions . . . of Polyaniline Film-Coated Electrodes", *J. Electroanal. Chem.*, 177, pp. 281–91 (1984) and in Shacklette, L. W., et al. "Structure and Properties of Polyaniline as Modeled by Single-Crystal Oligomers", *J. Chem. Phys.* 88 P 3955 (1988), which. are hereby incorporated by references.

In the preferred embodiments of the invention, poly(anilines) for use in the invention are homopolymers and copolymers of the type derived from the polymerization of unsubstituted and substituted anilines of the Formula I:

FORMULA I wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such as halo, hydrogen or other leaving group;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amine, alkylamino, dialkylamino, arylamino, diarylamino, alkylarylamino, aryl, alkylsulfinyl, aryl oxyalkyl, alkylsulfinylalkyl, alkoxyalkyl, alkylsulfonyl, arylthio, alkylsulfonylalkyl, boric acid or salts or esters thereof, phosphoric acid or salts or esters thereof, arylsulfinyl, alkoxycarbonyl, arylsulfonyl, carboxylic acid or salts or esters thereof, phosphonic acid or salts or esters thereof, halo, hydroxy, cyano, sulfinic acid or salts or esters thereof, phosphinic acid or salts or esters thereof, sulfonic acid or salts or esters thereof, nitro, alkylsilane, or any of the foregoing aryl, aliphatic or cycloaliphatic groups substituted with one or more phosphonic acid or salts or esters thereof, sulfonic acid or salts or esters thereof, phosphoric acid or salts or esters thereof, boric acid or salts or esters thereof, sulfinic acid or salts or esters thereof, phosphinic acid or salts or esters thereof, carboxylic acid or salts or esters thereof, halo, nitro, amine, alkylamino, dialkylamino, arylamino, diarylamino, alkylarylamino, cyano or epoxy moieties; or any two $R_1$ groups together, or any $R_1$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, carbonyl, sulfonyl or oxygen atoms wherein permissible substituents are one or more phosphonic acid or salts or esters thereof, sulfonic acid or salts or esters thereof, phosphoric acid or salts or esters thereof, boric acid or salts or esters thereof, phosphinic acid or salts or esters thereof, carboxylic acid or salts or esters thereof, halo, nitro, amino, alkylamino, sulfinic acid or salts or esters thereof, dialkylamino, arylamino, diarylamino, alkylarylamino, cyano or epoxy moieties; or $R_1$ is an aliphatic moiety having repeat units of the formula:

—(OCH$_2$CH$_2$)$_q$O—CH$_3$,
—(OCH$_2$CH(CH$_3$))$_q$O—CH$_3$, —(CH$_2$)$_q$CF$_3$,
—(CF$_2$)$_q$—CF$_3$ or —(CH$_2$)$_q$CH$_3$ wherein q is a positive whole number; and $R_2$ is selected from the group consisting of permissible $R_1$ substituents and hydrogen.

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonic acid, sulfinic acid, phosphoric acid, boric acid, or carboxylic acid groups such as ethylsulfonic acid, propylsulfonic acid, 4-nitrobenzene sulfonic acid, butylsulfonic acid, phenylsulfonic acid. and the like.

Also illustrative of useful $R_1$ groups are divalent moieties derived from any two $R_1$ groups or a $R_1$ group with a $R_2$ group such as moieties having from about 2 to about 7 repeat units of the formula:

wherein $R_3$ is the same or different at each occurrence and is hydrogen or alkyl, as for example —(CH$_2$)$_4$—, —(CH$_2$)$_3$—, —(CH=CH—CH=CH)—, —[CH$_2$—CH(CH$_3$)—CH$_2$]— and —(CH$_2$)$_5$—, and groups comprised of such moieties which include one or more heteroatoms of oxygen, nitrogen, ester, sulfonyl, carbonyl, sulfinyl, and/or sulfur, such as —CH$_2$SCH$_2$— —CH$_2$NHCH$_2$—, —SCH$_2$NHCH$_2$—, —O—CH$_2$—CH$_2$O— —O—CH$_2$—S—CH$_2$—, —CH$_2$S(O$_2$)CH$_2$—, —CH$_2$S(O)CH$_2$—, —OC(O)CH$_2$CH$_2$—, —CH$_2$C(O)CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran, aminobenzodiazine, benzthiopyrone amine, amino-coumarin, benzthiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred polyaniline consists of repeat units of the Formulas II, III or a combination thereof:

FORMULA III a combination thereof having various ratios of the above repeat units in the polyaniline backbone such as leucoemeraldine, protoemeraldine, emeraldine, nigraniline and pernigraniline. Poly(anilines) useful in the practice of this invention are more preferably those of the Formula IV:

FORMULA IV wherein:
n, m, $R_1$ and $R_2$ are as described above;
x and y are the same or different at each occurrence and are integers equal to or greater than 0, with the proviso than the sum of x and y is greater than 0, preferably where x is an integer equal to or greater than 0 and/or that the ratio of x to y is greater than or equal to about 0, more preferably said ratio is equal to or greater than 0.5 and most preferably said ratio is equal to or greater than about 1; and
z is the same or different at each occurrence and is an integer equal to or greater than about 5.

Preferred for use in the practice of this invention are poly(anilines) of the above Formula IV in which:
n is an integer from 0 or 1;
m is an integer from 3 or 4, with the proviso that the sum of n and m is equal to 4;
$R_1$ is phenyl, or alkyl or alkoxy having from 1 to about 12 carbon atoms, a protonic acid function or a salt or ester thereof, or alkyl, phenyl or alkoxy substituted with one more or protonic acids or salts or esters thereof;
x is an integer equal to or greater than 1;
y is equal to or greater than 0, with the proviso that the ratio of x to y is equal to or greater than 0.5;
z is an integer equal to or greater than about 5;

Particularly preferred for use in the practice of this invention are poly(anilines) of the above Formula IV in which:
n is an integer from 0 or 1;
m is an integer from 3 or 4 with the proviso that the sum of n and m is equal to 4;
$R_1$ is alkyl, or alkoxy having from 1 to about 6 carbon carboxylic acid or salts or esters thereof, phosphinic acid or salts or esters thereof, sulfonic acid or salts or esters thereof, sulfinic acid or salts or esters thereof, phosphonic acid or salts or esters thereof, or alkyl or alkoxy substituted with phosphinic acid or salts or esters thereof, sulfinic acid or salts or esters thereof, halo, phosphonic acid or salts or esters thereof, phosphoric acid or salts or esters thereof, or sulfonic acid or salts or esters thereof;
x is an integer equal to or greater than 2; and
y is equal to or greater than 0, with the proviso that the ratio of x to y is greater than about 1; and
z is an integer equal to or greater than about 10.

Amongst the preferred embodiments, more preferred for use in the practice of this invention are poly(anilines) of the above Formula IV in which:
n is an integer from 0 or 1;
m is an integer from 3 or 4, with the proviso that the sum of n and m is equal to 4;
$R_1$ is alkoxy or alkyl of from 1 to about 6 carbon atoms (preferably from 1 to about 3 carbon atoms), sulfonic acid or salts thereof, phosphoric acid or salts thereof, or phosphonic acid or salts thereof;
x is an integer equal to or greater than 2; and
y is an integer equal to or greater than 1; and
z is an integer equal to or greater than about 10.

In the most preferred embodiment of the invention;
n is 0;
m is 4;
x is an integer equal to about 2;
y is an integer equal to about 1, with the proviso that the ratio of x to y is equal to or greater than about 2; and
z is an integer equal to or greater than about 10.

In general, the number of conjugated homopolymer or copolymer repeat units are not critical and may vary widely. The greater the number of repeat units the greater the molecular weight of the conjugated homopolymer or copolymer and the greater the viscosity of solutions of the polymer. In the present application where conjugated homopolymers or copolymers of relatively high molecular weight and insolubility are required, then such materials can be used. The number of repeat units (z) is preferably at least about 10. The upper limit can vary widely depending on the desired molecular weight and viscosity and the required degree of processibility, such as melt processibility, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

Conjugated homopolymers and copolymers can be conveniently prepared through conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782; PCT WO88/00954; and "The Handbook of Conducting Polymers", edited by Terje A. Skotheim, Marcell Decker, Inc., New York and Basel and references cited therein, all of which is hereby incorporated by reference. For example, preferred polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about. 5 S $cm^{-1}$. This conductive form of polyaniline can be treated with ammonium hydroxide in ethanol to form a non-conductive form of polyaniline which is dark blue in color and which has a conductivity of less than $10^{-8}$ S $cm^{-1}$. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517 described above.

Useful forms of conjugated polymers can also be prepared electrochemically. For example, useful forms of polyaniline can be prepared by the electrochemical oxidation of aniline in aqueous fluoroboric acid electrolyte on a platinum foil anode.

Other useful conjugated polymers can be prepared pyrolytically. For example, polyacene can be prepared by the pyrolysis of phenolic resins as described in greater detail in U.S. Pat. Nos. 4,615,960; 4,628,015; 4,601,849; and 4,753,717.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The conjugated backbone homopolymer or copolymer is doped with a suitable dopant to render the polymer electrically conductive, i.e. an electrical conductivity of at least about $10^{-9}$ ohm $^{-1}$ cm$^{-1}$ by the four-in-line probe method. Any doping procedure may be used. Such methods are conventional and will not be described herein in any great detail. For example, the conjugated backbone homopolymer or copolymer is best doped by contacting the dopant with the polymer for a time sufficient to doped in the desired extent. The polymer can be contacted with the dopant in the gaseous state, in the liquid state, neat, or diluted by some suitable diluent such as a gas as for example air, or liquid such as water, or an organic liquid. The dopant can be contacted with the conjugated backbone homopolymer or copolymer either during polymerization or after polymerization. In a preferred embodiment of the invention, the conjugated backbone homopolymer or copolymer may be doped in either by carrying out the polymerization in the presence of an acid having a pKa in the solution equal to or less than that of the homopolymer or copolymer. In general, the higher the pKa of the conjugated backbone homopolymer or copolymer, the higher the acid pKa can be used to provide a conductive polymer; and conversely, the lower the pKa of the conjugated backbone polymer the lower the pKa of the acid can be used to provide a desired degree of electrical conductivity. The pKa of the acid is preferably equal to or less than about 5, more preferably equal to or less than about 4, and the most preferably equal to or less than about 3.

In another preferred embodiment of the invention, the conjugated backbone copolymer or homopolymer can be doped after polymerization. For example, the conjugated backbone homopolymer or copolymer layer is doped by contact with a solution of the dopant in a suitable solvent such as water.

Dopants for use in the practice of this invention can vary widely. As used herein a dopant is a compound or compound mixture which is capable of doping said conjugated backbone polymer to render said polymer electrically conductive and which is capable of modifying the solubility parameter of the conjugated polymer. Useful dopants may vary widely. In general, such dopant solute is derived from a compound, which upon addition to the conjugated backbone polymer, creates charge carriers (holes or free electrons) on the conjugated backbone polymer and renders the polymer conductive. Useful dopants include "oxidizing dopants" and "reducing dopants". As used herein an "oxidizing dopant" is a dopant which renders the conjugated backbone polymer with desired conductivity via an oxidation step. As used herein an "reducing dopant" is a dopant which renders the conjugated backbone polymer with desired conductivity via a reduction step.

Illustrative of useful dopants are non-oxidizing protonic acids such as those of containing anionic moieties of the formula:

and having one or more cationic moieties selected from the group consisting of:

wherein:
R$_4$ and R$_6$ are the same or different at each occurrence and are organic radical or amino;
M is a species having a positive charge equal to s, provided that at least one of M$^{+s}$ is a proton or a moiety which can be transformed by radiation, heat, chemicals and the like into a proton under use conditions such as NH$_4^+$, $^+$N(CH$_3$)$_2$H$_2$, $^+$N(C$_2$H$_5$)H$_3$, Ph$_3$S$^+$ and the like;
s is the same or different at each occurrence and is an integer equal to 1 to 8;
r is the same or different at each occurrence and is 0 or a positive integer equal to or greater than 1, with the proviso that at least one of r is other than 0.

The R$_4$ and R$_6$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. R$_4$ and R$_6$ groups may also be a polymeric radical such as a polymer having recurring pendant phenyl groups in the polymeric backbone substituted with sulfonic acid and derivatives thereof such as salts and esters, phosphoric acid and derivatives thereof such as salts and esters, phosphonic acid and derivatives thereof such as salts and esters, sulfinic acid and derivatives thereof such as salts and esters, carboxylic acid and derivatives thereof such as salts and esters, boric acid and derivatives thereof such as salts and esters, or phosphonic acid and derivatives thereof such as salts and esters; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, R$_4$ and R$_6$ are aromatic radical and in the most preferred embodiments R$_4$ and R$_6$ are substituted or unsubstituted phenyl or naphthyl. The nature of the M$^{+S}$ group may vary widely. For example, M$^{+S}$ may be a non-metal cation such as Bu$_4$N$^+$, H$^+$, NO$^+$, NO$_2^+$, NH$_4^+$, $^+$N(CH$_3$)$_2$H$_2$, $^+$N(C$_2$H$_5$)H$_3$, Ph$_3$S$^+$ and the like, or may be a metal cation such as Na$^+$, Li$^+$, Ag$^+$, Ba+2, Co+3, Al+3, Fe+3 and the like.

Preferred for use in the practice of this invention are organic acid dopants, more preferably those having anionic moieties of the formulas:

and having a cationic moiety of the Formula:

wherein at least one of the cationic moieties of the formula M$^{+s}$ is a proton or is a moiety which can be transformed into a proton under use conditions;
M$^{+s}$ is a cationic species having a positive charge s;
s is an integer equal to or greater than 1, preferably from 1 to about 8;
R$_4$ and R$_6$ are organic radicals or amino, and
r is an integer equal to or greater than 1, preferably from 1 to about 8;

More preferred for use in the practice of this invention as dopants are acids or acid derivatives of the formula:

$R_4(PO_2(R_6)M)_g(PO_3M_2)_f(SO_3M)_c(CO_2M)_d(PO_2M_2)_t(SO_2M)_h(PO(R_6)M)_i$ or wherein:

M is H+, or other metal or non-metal cation with the proviso that at least one of M is H+ or a moiety which can be thermally or chemically transformed into a proton under use conditions, such as +NH$_4$, +N(CH$_3$)$_2$H$_2$, +N(C$_2$H$_5$)H$_3$, Ph$_3$S+ and the like;

t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;
e is 0, 1 or 2; and

R$_4$ and R$_5$ are the same or different at each occurrence and are nitro, cyano, hydroxy, halo, amino, alkylamino, dialkylamino, arylamino, diarylamino, alkylarylamino, alkoxy, or substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid, phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two R$_6$, or any two R$_5$, or R$_4$ and any R$_6$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or R$_4$ or R$_5$ is a moiety of the formula:

—(CH$_2$)$_q$CF$_3$, —(CF$_2$)$_q$CF$_3$,
—(CH$_2$)$_q$CH$_3$—(OCH$_2$CH$_2$)$_q$OCH$_3$ or
—(OCH$_2$CH(CH$_3$))$_q$OCH$_3$ wherein:
q is a positive whole number from 1 to about 10; and
R$_6$ is alkyl, aryl, aryloxy or alkoxy.

In the particularly preferred embodiment of this invention, useful dopants are acids and/or acid derivatives of the above formula:

$R_4(PO_2(R_6)M)_g(PO_3M_2)_f(SO_3M)_c(CO_2M)_d$-$(PO_2M_2)_t(SO_2M)_h(PO(R_6)M)_i$ wherein:
c is 0, 1, 2 or 3;
d, t, f, g, h and i are the same or different at each occurrence and are with the proviso that at least one of c, d, t, f or g, i or h is other than 0;
e is 0, 1 or 2;

R$_4$ and R$_5$ are the same or different are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two R$_6$, or any two R$_5$ or R$_4$ and any R$_6$ substituents together may form an unsubstituted or substituted or alkenylene chain completing a naphthalene, anthracene or phenanthrene fused ring system wherein permissible substituents are as described above or R$_4$ or R$_5$ is a moiety of the formula:

—(CH$_2$)$_q$CF$_3$, —(CF$_2$)$_q$CR$_3$, —(CH$_2$)$_q$CH$_3$,
—(OCH$_2$CH$_2$)$_q$OCH$_3$ or
—(OCH$_2$CH(CH$_3$))$_q$OCH$_3$ wherein:
q is a positive whole number from 1 to about 10;
R$_6$ is alkyl, alkoxy, aryloxy or aryl; and
M is H+, or other metal or non-metal cation, with the proviso that at least one of M is H+ or a moiety which can be thermally or chemically transformed into a proton under use conditions.

In the most preferred embodiments of this invention, useful dopants are acids and/or acid derivatives of the formula:

$R_4(PO_2(R_6)M)_g(PO_3M_2)_f(SO_3M)_c(CO_2M)_d$ or wherein:
c, d, e, f and g are the same or different and are 0, 1 or 2, with the proviso that at least one of c, d, f and g is not 0;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphonic acid, phosphinate salt, phosphonate salt, amino or carboxylic acid groups, or phenyl substituted with one or more alkyl, alkoxy, fluoroalkyl, sulfonic acid, phosphinic acid, phosphonic acid, phosphinate salt, phosphonate salt, sulfonate salt, carboxylate, hydroxy, nitro, cyano, or carboxylic acid groups or any two $R_6$, or $R_4$ and any $R_6$, or any two $R_5$, substituents together may form an alkylene or alkenylene chain completing a naphthalene, anthracene or phenanthrene fused system which may be substituted with one or more alkyl, alkoxy, fluoro, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^+$ or is a moiety which can be thermally transformed into a proton under use conditions.

In the especially preferred embodiments of this invention, useful dopants are acids or acid derivatives of the formula:

$$R_4(SO_3M)_c(CO_2M)_d$$

or wherein:
c is 1, 2 or 3;
d is 1, 2 or 2 with the proviso that at least one of c, d is not 0;
e is 0, 1 or 2;

$R_4$ and $R_5$ are th same or different at each occurrence and are hydroxy, dialkyl amino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate, amino or carboxylic acid groups, or phenyl substituted with one or more alkyl, alkoxy, fluoroalkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups; or any two $R_6$, or any two $R_5$, or $R_4$ and any $R_6$ substituents together may form an alkylene or alkenylene chain completing a naphthalene, anthracene or phenanthrene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups;

M is $H^+$ or other metal or non-metal cation or a moiety which can be thermally transformed into a proton under conditions.

In the process of the embodiment of this invention of choice, the dopant is a sulfonic acid or sulfonic acid derivative of the formula:

wherein;
c is 1, 2 or 3;
e is 0, I or 2;

$R_5$ is alkyl or alkyl substituted with one or more fluoro groups, or any two $R_5$ groups together may form an alkenylene chain completing a naphthalene fused ring system which may be substituted with one or more sulfonic acid, sulfonic salt group or a combination thereof; and M is a proton, or other metal or non-metal cation, with the proviso that at least one of M is proton.

The conjugated polymer may be doped with a single dopant or may be doped with multiple dopants in any arrangement. In the preferred embodiments of this invention the particles of the conjugated polymer are doped. In these preferred embodiments, particles of an ionized, electrically conductive conjugated polymer (polymer cation) doped at or near the surface of the particle with one or more dopant solutes (anions) which modify the solubility parameter of the polymer to the desired extent. The entire particle can be doped with the same dopant predominating at or near the surface of the particle, or the particle can have a skin core dopant structure where the dopant solute at or near the surface of the particle is different from the dopant solute in the remainder of said particle. In the preferred embodiments of the invention the particle has a skin-core structure.

In some conjugated polymer compositions, particles may exist as aggregates composed of smaller primary particles. It is generally most preferred for the production of uniform blends of high conductivity that these aggregates be broken down to their primary particles during compounding.

The amount of dopant used in the practice of this invention can vary widely. Any amount of dopant can be used as long as the used amount renders a desired amount of conjugated polymer soluble or dispersible in the desired liquid or polymer for conveniently performing the desired process. In the preferred embodiments of this invention, an amount of dopant is used to render from about 0.001 wt % to about 100 wt % of said conjugated backbone polymer soluble or dispersible to a particle size less than about 100 nm in said polymer, solvent or solvent mixture; more preferred from about 0.1 wt % to about 100 wt % of said conjugated polymer; particularly preferred from about 1 wt % to about 100 wt %; most preferred from about 10 wt % to about 100 wt %.

The concentration of the dissolved or dispersed electrically conductive conjugated polymer in the desired matrix liquid or matrix polymer is not critical. Any concentration can be used which is suitable for any processing techniques either known in the art or that will be developed in the future. In the preferred embodiments of this invention, the concentration of said conjugated polymer in the matrix liquid or matrix polymer is at least about 0.001 wt % based on the weight of said solution or polymer composite; more preferred is at least 0.01 wt %; particularly preferred is at least 0.1 wt %, and most preferred is at least 1 wt % to about 30%.

In the third step of the process of this invention the doped conjugated polymer is dispersed or dissolved in the selected liquid or polymer matrix. Any conventional process can be used. For example, liquid dispersion or solutions of this invention can be formed through use of any suitable procedure, as for example by direct dissolution or dispersion of the doped electrically conductive polymer in a suitable solvent; or, alternatively by dissolving the dopant and the neutral polymer individually in any appropriate solvent. For example, the neutral conjugated backbone polymer can be dissolved (if soluble) or dispersed (if insoluble) in the desired solvent and then mixed with the desired dopants or dopant solution of the same or different solvent or solvent mixture. The conjugated polymer can also be dissolved in a solvent other than the desired solvent and then mixed with a solution of said desired dopant in the desired solvent. For another example, the conjugated polymer and the desired dopant can be first dissolved separately in a solvent different from the desired solvent and then mixed with each other in the desired solvent. For another example the conjugated polymer and the desired dopant can be dispersed sequentially or simultaneously in the desired solvent and then followed by the addition of a compound or solvent which will initiate the formation of a solution phase of doped conducting polymer by enhancing the dissolution characteristics of at least one of said dispersed components in the desired solvent.

In a melt compounding process, solid solutions and dispersions of the doped conjugated polymer in a polymeric matrix can be formed by heating and mixing a mixture of the various components to a temperature which is equal to or greater than the melting point or flow point of at least one of the polymer components to form a molten mixture to which optional components may be added as desired. Thereafter the mixture can be formed into a desired article through use of any conventional shape forming technique. For example, the molten mixture can be spread or extruded and allowed to cool forming free standing films or film coatings other substrates. The molten mixture can be extruded through a die to form films or fibers, or injection molded into a suitable mold to form molded parts having the shape of the mold. The manner in which the molten mixture is formed is not critical and conventional methods can be employed. For example, the molten mixture can be formed through use of conventional polymer and additive blending means, in which the polymeric components are heated to a temperature equal to or greater than the melting point or softening of at least one of the polymers, but below the degradation temperature of each of the polymers. Ultrasonication can be used to improve dispersion of the non-soluble phases. The desired amount of the optional ingredients in a liquid or powdered form can be added to the melted polymers before or during a mixing step. Such optional additives include dispersion aids, surfactants, plasticizers, lubricants, antioxidants, light stabilizers, additional conductive fillers, mineral fillers, additional polymers, and the like.

In a solution process for the preparation of the compositions of this invention, the desired matrix polymer can be dissolved in a suitable solvent with or without a dopant for the conductive polymer also being present. The conductive polymer in an undoped, partially doped, or fully doped form may be dissolved or dispersed in the same or different solvent and combined with the solution of the matrix polymer. Desired optional components in the appropriate amounts may also be dissolved or dispersed in the solution. Such optional components include dispersion aids, surfactants, plasticizers, lubricants, antioxidants, light stabilizers, additional conductive fillers, mineral fillers, additional polymers, and the like. The dissolved and/or dispersed polymers can be solidified into a desired shape by removal of the solvent through use of conventional techniques, for example, by removal of the solvent by evaporation. Alternatively, the solvent may be removed by extruding or spinning the solution through a die, into a bath containing a non-solvent for both polymers to form a fiber or film.

Another aspect of this invention relates to a method of using the conductive solution for making conductive articles, such as films, fibers, foams, parts, paints, inks and the like. Methods for forming such conductive articles can vary widely. Any method known in the art may be used. For example, melt spinning, solution spinning and gel spinning techniques can be used for forming conductive fibers from the conductive solution of this invention. Spin coating, cast coating, doctor blades, transfer coating, graphic printing can be used for forming conductive films either free standing or on a substrate, and coatings from the conductive solution of this invention. Conductive composites or blends can be prepared from the conductive solution of this invention by adding desired organic or inorganic fillers or binders into said conductive solution.

Whether formed by solution techniques or by melt compounding, the conductive blends or composites of this invention can then be processed further, using any processing method known in the art, into various conductive articles, such as conductive films, fibers, foams, parts, paints and inks. Illustrative of such techniques are compression molding, cold molding, blow molding, injection molding, transfer molding or rotational molding, extrusion molding, calendaring, sintering, compaction, extrusion, agitation, fusion, and the like. Useful fillers, binders or substrates may be formed of organic materials, inorganic materials, or a combination of such materials. Illustrative of useful inorganic fillers, binders or substrates are s materials such as carbon black, graphite, mica, clay, glass, ceramics, $SiO_2$, other minerals and the like.

The electrically conductive article of this invention formed from the solid or liquid dispersion or solution can be used for any purpose for which conductive articles are useful. Examples of articles include conductive polymer housings for EMI shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; optically transparent or non-transparent corrosion-preventing coatings for corrodible materials such as steel; antistatic materials and optically transparent or non-transparent coatings for packaging electronic components; antistatic carpet fibers; waxes for floors in computer rooms; antistatic: finishes for CRT screens, aircraft, and auto windows; and the like.

Various other applications are anticipated for the conducting coatings produced by the present process, compounds and solutions such as in conducting plastic gas tanks; solar window coatings; transparent electrical elements for heated windows and liquid crystal displays; electrochromic displays, electrical contacts for electroluminescent displays and electroluminescent lights, and electrical contacts for piezoelectric films and devices; transparent conducting coatings for windows in burglar alarm systems; membrane coatings for chemical separations (such as $O_2$ and $N_2$, for example); and conducting coatings for membrane switches; and a discharge layer or photoresist layer for lithographic process.

Specially useful coatings of conducting polymers are those which are transparent in the visible spectral region. By transparent in the visible region, it is meant that at least 25% of the solar energy spectrum in the visible region is transmitted by the coating. Since transparency is inversely related to conducting polymer thickness, a desired degree of transparency can be obtained by limiting the thickness of this layer, or by limiting the relative amount of the conductive polymer in proportion to the matrix polymer. The conductivity vs transparency of the conductive polymer blend or composite will depend critically on the phase morphology of the conductive polymer within the insulating matrix polymer. The presence of a high proportion of small conductive particles less than or equal to about 200 nm will promote the formation of a chain-like or fractal morphology which will impart high conductivity at low loadings of the conductive polymer. The process of this invention provides a means for attaining such a fine particle morphology. When the blends or composites of this invention are used in structural applications, properties such as tensile strength, elongation, and impact resistance will also be enhanced by a fine particle morphology.

The following examples are illustrative of the invention and should not be construed as limitations thereto.

EXAMPLE I

Into a solution containing 1770 mL $H_2O$, 50g aniline (0.54 mole) and 172 g tosylic acid (0.90 mole) was added drop-wise at 15° C. a solution of ammonium persulfate (153.4 g in 336.5 mL $H_2O$) over a period of 40 minutes. The reaction was then allowed to continue at 15° C. for 0.5 hour.

The resulting solid precipitate was collected and washed by 6 L tosylic acid aqueous solution (10 wt %) and then with 3 L of methanol. A blue solid was obtained which dried in air for 25 h, and dried at 130° C. for 3 h under dynamic vacuum to give a green powder. The conductivity of the dried and pressed pellet was 1 S cm$^{-1}$ as measured by the four in line probe method. The conductivity of the moisture-saturated pellet was 20 S cm$^{-1}$ by the four-in-line probe method.

The yield was 78 g. The intrinsic viscosity (in $H_2SO_4$ at 25° C. was 0.66 dL/g. The elemental analysis were:

| C: 64.37% (wt %) | H: 4.86% | N: 8.59% |
|---|---|---|
| S: 8.40% | O: 13.51% | |

Moisture: less than 0.8 wt %

EXAMPLE II

Poly(anilinium tosylate) (50g) obtained in Example 1 was suspended in 500 mL $H_2O$ and stirred with 30 g of sodium carbonate at ambient temperature for 20 hrs. The resulting solid was collected by filtration and rinsed with 2 L of deionized water. The filter cake was dispersed in 1.5 L of deionized water and stirred for 4 h to remove sodium carbonate residue. The solid was then re-collected by filtration and rinsed with 2 L of deionized water. The resulting filter cake was air-dried at 25° C. for 20 h and then vacuum-dried at 80° C. for 3h.

The elemental analysis results showed that the sample was free of dopant (S<0.03 wt %) and sodium carbonate (Na, non-detectable).

EXAMPLE III

The modifying effect of the dopant species on the solubility of a conjugated backbone polymer was examined by mixing a selected dopant, such as a protonic acid dopant, with a undoped conjugated backbone polymer, such as polyaniline, in the presence of a solvent, such as N-methyl pyrrolidinone. A typical experiment was as follows:

Into a 2 dram vial was placed 0.1 g of the neutral polyaniline obtained in Example II. To the vial 2 mL of N-methyl pyrrolidinone was added. The neutral polyaniline dissolved to form a blue solution. Into this blue solution about 0.2 g of a selected acid dopant was added to dope the polyaniline in the solution. The doped polyaniline either remained dissolved in the solvent to form an electrically conductive solution, or precipitated out of the solvent, depending on the acid dopant used. The results are summarized in the following Table I.

TABLE I

| DOPANT | RESULT |
|---|---|
| Trifluoroacetic Acid | Green Solution |
| Pentafluoropropionic Acid | Green Solution |
| Perfluorooctanoic Acid | Green Precipitation |
| Perfluorodecanoic Acid | Green Precipitation |
| Trifluoromethane Sulfonic Acid | Green Solution |
| Methane Sulfonic Acid | Green Precipitation |
| Ethane Sulfonic Acid | Green Solution |

EXAMPLE IV

Polyaniline (PAni) (320 g) doped with para-toluene sulfonic acid (PTSA) (PAni-OTs) (approx. 8% S) was filtered on a Buchner funnel and was placed into a bucket, and 3 liters of 1 M PTSA having a concentration of 1 mol/L were added and stirred for ½ hour. The material was again filtered on the Buchner funnel. Then the filtrate was combined with 3 liters of boiling water and the mixture was stirred with an agitator/mixer for 10 minutes, then filtered on the Buchner funnel. The filter cake had a sulfur content of about 5 % by weight. A solution of methanol (2.5L) containing 2 weight % of para-dodecylbenzene sulfonic acid (DBSA) were added to the filter cake and stirred for ½ h. The mixture was then filtered again. The filtered material was dried in a fluid bed dryer at a maximum temperature of 80° C.

The skin/core particles, (PAni-tosylate (OTs)-dodecylbenzene sulfonate (DBS)), and polyaniline tosylate (PAni-OTs) particles were combined with matrix polymers, polycaprolactone (PCL) and poly(ethylene terephthalate glycol) (PETG), into composites.

The relative proportions of the polyaniline components were varied over a range of samples from about 50% by weight polyaniline to about 5% by weight. Conductivity of compression molded samples of each blend was measured by a four-probe technique. A plot of the logarithm of conductivity as a function of volume percent polyaniline gave an approximately "S" shaped curve in each case. Such characteristic "percolation" curves were analyzed to determine a "percolation point" (the point of steepest rise in conductivity) specified by the volume percent loading of polyaniline at that point, and the saturation conductivity as evidenced by the conductivity observed for the highest loading level for polyaniline in the blend.

The results are set forth in the following Table II. In the Table, the conductivity of polyaniline is given in the first row and is that taken on a compressed pellet consisting of 100% polyaniline containing the specified dopant anion(s). The saturation conductivity given in the bottom row refers to the blend with PETG.

TABLE II

| Property | Doped PAni Particles | |
|---|---|---|
| | (PAni-OTS) | (PAni-OTs/DBS) |
| A. Conductivity of PAni | 7.55 S CM−1 | 4.5 S cm−1 |
| B. Percolation Point in PCL | 8% | 8% |
| C. Percolation Point in PETG | 20–25% | 9.5% |
| D. Saturation Conductivity in PETG | 5 × 10−4 S cm−1 | 2.5 S cm−1 |

EXAMPLE V

Polyaniline tosylate (PAni-OTs) was prepared from aniline, p-toluene sulfonic acid (PTSA), and ammonium persulfate solution by first combining the aniline and the acid, and then slowly adding the ammonium persulfate solution to the acid and aniline solution in approximately one hour. The solids which were formed were then filtered and washed successively twice with water (75° C.), once with 5% solution of PTSA (slurry for 1 to 2 hrs), and finally with a 2% solution of PTSA in methanol. After filtration, the solids were dried in a vacuum oven at 130° C. until the temperature of the powdered solids reached 110° C. The water content of the solids was determined to be less than 3% by weight.

EXAMPLE VI

Polyanilinium tosylate coated by dodecylbenzene sulfonate (PAni OTs/DBS) was prepared as in Example V with the exception that dodecylbenzene sulfonic acid (DBSA) was substituted for the PTSA in the final methanol wash. By elemental analysis the resulting dried powder was found to contain approximately (by molar ratio) 70% OTs and 30% DBS. Since exposure of PAni OTs to a concentrated solution of DBSA will cause the replacement of PTSA with DBSA via a process which requires the outward diffusion of PTSA and the inward diffusion of DBSA, the above process produced a polyaniline which was preferentially doped on the surface of each powder grain and/or primary particle with DBSA.

EXAMPLES VII to XII and COMPARISON EXAMPLE 1

Polyaniline tosylate was prepared as in Example V. This polyaniline was slurried in a wash in the manner of Example V containing from 2 to 4 percent by weight of a compatibilizing dopant, and then filtered and dried in a fluid-bed drier. The compatibilizing dopant employed were decyldiphenylether disulfonic acid (Dowfax TM-3BO), dinonylnaphthalene sulfonic acid (DNN), linear $C_{10}$-substituted diphenyl ether disulfonic acid (CF10LA) (CALFAX 10LA-40 obtained from Pilot Chemical Co.) and long-chain alkyl sulfonic acids (Aristol-M (molecular weight 450) and Aristol-H (molecular weight 500)) obtained from Pilot Chemical Co. Corporation.

This polyaniline was blended in poly(ethylene terephthalate glycol), PETG, at 190° C. in a Brabender TM mixer beginning at a concentration of 40 percent by weight. This mixture was successively diluted to lower concentrations of polyaniline by withdrawing samples of the blend and replacing the withdrawn sample by an equivalent weight of PETG. The samples of the polyaniline/PETG blend were then compression molded (Hot-pressed) to form thin sheets. The conductivity of the sheets was then measured by means of a four probe apparatus consisting of a square array of probes spaced 1-cm apart.

Figure 1:
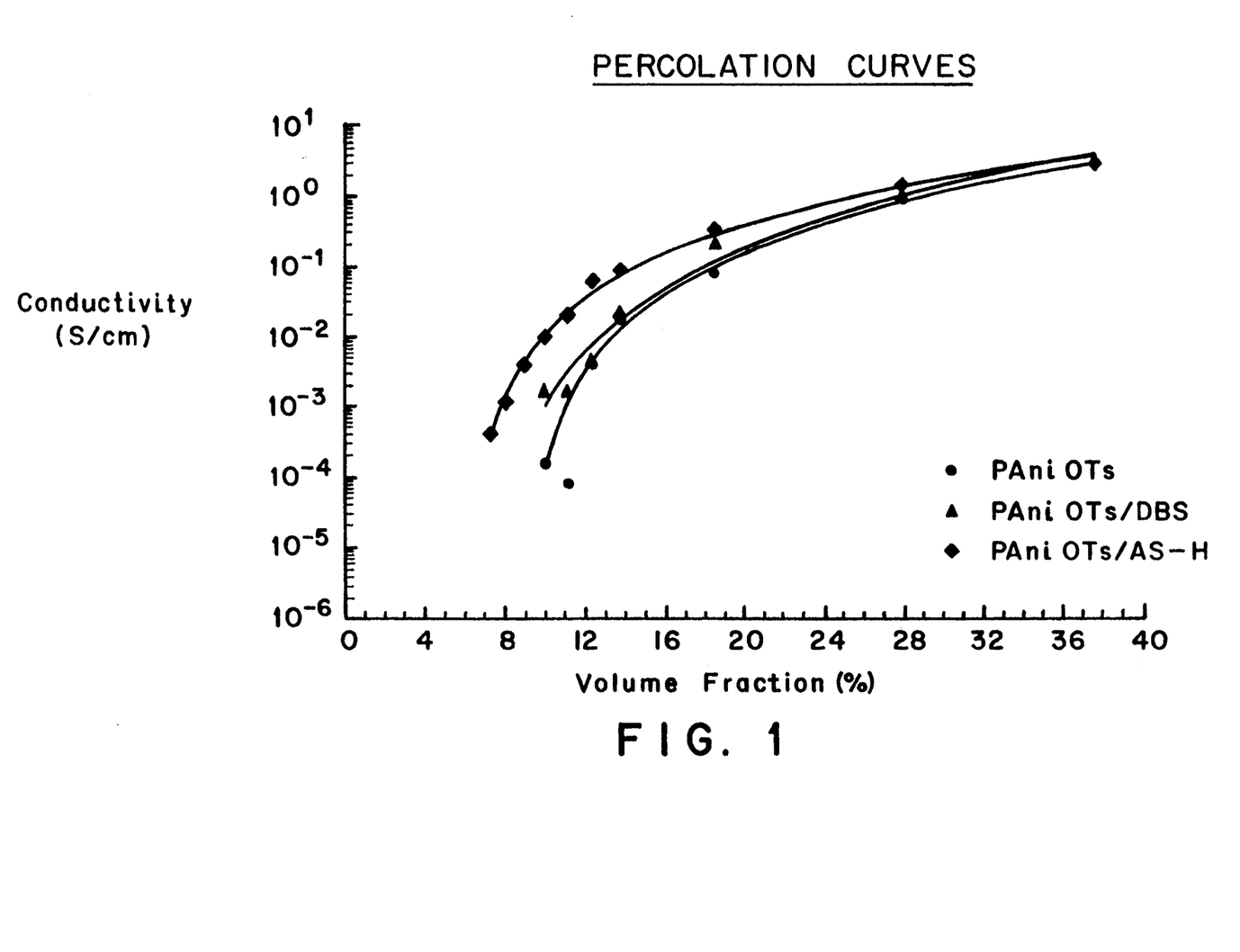
FIG. 1 is a percolation graph of conductivity versus volume fraction loading (in percent) of polyaniline particles in an insulating matrix polymer, poly(ethylene terephthalate gycol).

The conductivity as a function of the concentration of polyaniline in volume percent determines a percolation curve for the blend. The critical concentration for percolation (i.e., the formation of continuous three dimensional pathways for electronic conduction) is theoretically associated with the point of steepest rise in a plot of the logarithm of conductivity vs the percentage of loading volume of the conductive filler. An example of such curves is shown in FIG. 1 which compares the results for polyaniline tosylate (PAni OTs) with those for two compatibilized compositions having a core/skin dopant arrangement on polyaniline particles, PAni OTs/DBS and PAni OTs/AS-H. Since the inflection point is difficult to determine directly from the plot, we have used the fact that for a random distribution of particles the conductivity above the percolation point is expected to follow a relation of the form, $\sigma = \sigma_o(\delta - \delta_c)^\tau$, where $\sigma$ is conductivity, $\delta$ is the fractional loading of the conductive component in the insulating matrix, $\delta_o$ is the critical loading for percolation, i.e., the percolation point and $\sigma_o$ and $\tau$ are constants. The parameters, $\delta_c$ $\sigma_o$ and $\tau$ are determined by a numerical fit to the data. The results of such a fit is shown for three separate cases in FIG. 1 as the smooth curves. The data obtained for various samples with different compatibilizers is summarized in Table 1. Also listed are the data for saturation conductivity ($\delta_{sat}$) and for the conductivity at an intermediate loading level (18.5 volume percent, $\delta_{18.5}$).

TABLE 1
Polyaniline compositions with Compatibilizing Skin Dopants

| Ex. No. | Composition | $\delta_c \times 100\%$ (vol %) | $\sigma_{sat}$* (S cm$^{-1}$) | $\sigma$18.5 (S cm$^{-1}$) |
|---|---|---|---|---|
| Comp. Ex. 1 | PAni OTs | 8.80 | 2.9 | 0.075 |
| VII | PAni OTS/DBS | 6.77 | 3.2 | 0.21 |
| VIII | PAni OTs/3BO | 8.06 | 2.2 | 0.78 |
| IX | PAni OTs/DNN | 6.44 | 1.3 | 0.017 |
| X | PAni OTs/CF10LA | 7.61 | 2.0 | 0.085 |
| XI | PAni OTs/AS-M | 6.14 | 2.7 | 0.23 |
| XII | PAni OTs/AS-H | 6.18 | 2.8 | 0.32 |

*Saturation Conductivity (taken to be conductivity at 40 vol %)
Conductivity at 18.5 vol %
OTs - Tosylate
3BO - Decyldiphenyl ether disulfonate (DOWFAX 3BO)
DNN - Dinonylnaphthalene sulfonate
CF10LA - Linear C$_{10}$ substituted diphenyl ether disulfonate (CALFAX 10LA-40)
AS-M - Alkylaryl sulfonate (Aristol-M, MW = 450)
AS-H - Alkylaryl sulfonate (Aristol-H, MW = 500)

In general it is desirable for the percolation point to be as low as possible and the conductivity at 18.5 vol % to be as high as possible, since one desires to obtain the highest conductivity at the lowest loading. The single most important parameter is the conductivity at the intermediate doping level, since such a point represents a practical compromise between obtaining high conductivity (for which the highest loading is desired) and the best mechanical properties for the blend (for which the lowest loading level is desired). On this basis the sample treated with Dowfax ™ 3BO is the best followed by that treated with AristoI-H.

What is claimed is:

1. A process of forming an electrically conductive blend, solution or dispersion comprising an electrically substituted or unsubstituted conductive conjugated polymer dissolved or dispersed in a liquid matrix or polymeric matrix, said process comprises the steps of:
    selecting a matrix liquid or a matrix polymer for the blend, solution, or dispersion, said matrix liquid or matrix polymer having a first solubility parameter;
    doping a substituted or unsubstituted conjugated polymer having a second solubility parameter, which is incompatible with said selected matrix liquid or matrix polymer, with at least one dopant solute to modify the solubility parameter of said conjugated polymer such that the said second solubility parameter of said conjugated polymer is closer to said first solubility parameter of said selected matrix liquid or matrix polymer and said doped conjugated polymers are compatible; and
    dissolving or dispersing said doped conjugated polymer in said liquid or polymer matrix to form said electrically conductive blend, solution or dispersion.

2. A process according to claim 1 wherein said conjugated polymer is a substituted or unsubstituted polyaniline.

3. A process according to claim 2 wherein the polyaniline comprises repeat units of the Formulas II, III or a combination thereof:

FORMULA II

-continued

FORMULA III wherein:
    n and m are the same or different and are integers from 0 to 4 with the proviso that the sum of n and m is 5;
    R$_1$ is phosphinic acid, phosphonic acid, sulfonic acid, boric acid, phosphoric acid, alkylamino, arylamino, alkylarylamino, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, aryl alkyl, aryloxy, amino, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, phosphinate salt, alkylamino, dialkylamino, arylamino, diarylamino,phosphinic acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two R$_1$ substituents or any one R$_1$ substituent and R$_2$ substituent taken together may form substituted or unsubstituted alkylene, alkynylene or alkenylene chain completing a 3, 4, 5, 6, 7, 8, 9 or 10 membered aromatic, heteroalicyclic, heteroaromatic or alicyclic carbon ring, which ring may include one or more divalent ester, carbonyl, nitrogen, sulfur, sulfinyl, sulfonyl or oxygen, wherein permissible substituents are one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties, or R$_1$ is an aliphatic moiety having repeat units of the formula:

wherein q is a positive whole number; and
    R$_2$ is the same or different at each occurrence and is R$_1$ substituents or hydrogen.

4. A process according to claim 3 wherein said polyaniline is of the Formula IV:

wherein:
x and y are the same or different at each occurrence and are integers equal to or greater than 0, with the proviso that the sum or x and y are greater than 0;
z is an integer equal to or greater than about 1;

n is an integer from 0 to 3;
m is an integer from 1 to 4, with the proviso that the sum of n and m is 4;
$R_1$ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphonic acid, alkylsilyl, boric acid, arylsulfonyl, carboxylic acid, halo, hydroxy, phosphate salt, sulfonate salt, phosphonate salt, borate salt, phosphinate salt, carboxylate salt, nitro, cyano, sulfonic acid, phosphoric acid or aryl, alkyl or alkoxy substituted with one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salt, phosphinic acid, phosphinate salt, carboxylate salt, phosphonic acid or borate salt substituents; or any two $R_1$ groups or any one $R_1$ group and $R_2$ group together may form a substituted or unsubstituted alkylene or alkenylene chain completing a 3, 4, 5, 6, 7, 8, 9 or 10 membered heteroaromatic, heteroalicyclic, aromatic or alicyclic carbon ring, which chain may include one or more divalent nitrogen, ester, carbonyl, sulfur, sulfinyl, sulfonyl or oxygen group, wherein permissible substituents are one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salts, phosphinic acid, phosphinate salt, carboxylate salts, phosphonic acid or borate salt substituents,
$R_2$ is the same of different at each occurrence and is $R_1$ substituents or hydrogen.

5. A process according to claim 4 wherein:
m is 2 or 3;
n is 0 or 1;
$R_1$ is the same or different at each occurrence and is alkyl having from 1 to about 10 carbon atoms or alkoxy having from 1 to about 10 carbon atoms;
$R_2$ is hydrogen or alkyl having from 1 to about 10 carbon atoms;
x is an integer equal to or greater than 1;
y is equal to or greater than 0; and
z is an integer equal to or greater than about 5.

6. A process according to claim 5 wherein $R_2$ is hydrogen.

7. A process according to claim 4 wherein m is 4 and n is 0.

8. A process according to claim 7 wherein said dopants are acids or acid derivatives of the formula:

wherein:
M is $H^+$, or other metal or non-metal cation with the proviso that at least one of M is $H^+$ or a moiety which can be thermally or chemically transformed into a proton under use conditions;
t is 0, 1, 2, 3 or 4;
i is 0, 1, 2, 3 or 4;
h is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4 with the proviso that at least one of t, i, h, c, d, f or g is other than 0;
e is 0, 1 or 2; and
$R_4$, $R_5$ and $R_6$ are the same or different at each occurrence and are nitro, cyano, hydroxy, halo, amino, alkylamino, dialkylamino, arylamino, diarylamino, alkylarylamino, alkoxy, or substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid, phosphate salt, boric acid, sulfinate salt, phosphinate salt, sulfinic acid, borate salt, phosphinic acid, phosphonate salt, phosphonic acid, carboxylic acid, nitro, carboxylate salt, or any two $R_6$ or any two $R_5$ or any $R_4$ and $R_6$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ is a moiety of the formula:

wherein:

q is a positive whole number from 1 to about 10.

9. A process according to claim 8 wherein said dopants are selected from the group consisting of acids, acid derivatives and mixtures thereof each of the formula:

or $R_4(PO_2(R_6)M)_g(SO_3M)_c(CO_2M)_d(PO_3M_2)_f$ or wherein:

c, d, e, f and g are the same or different and are 0, 1 or 2 with the proviso that at least one of c, d, and g is not 0;

$R_6$ is aryl, aryloxy, alkyl or alkoxy;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkyxy, carboxylate salt, hydroxy, nitro, cyano, phosphinic acid, phosphinate salt, amino or carboxylic acid groups, or phenyl substituted with one or more alkyl, alkoxy, fluoroalkyl, sulfonic acid, phosphinic acid, phosphinic salt, sulfonate salt, carboxylate, hydroxy, nitro, cyano, or carboxylic acid groups or any two $R_6$ or any two $R_5$ or any $R_4$ and $R_6$ substituents together may form an alkenylene chain completing a naphthalene anthracene or phenanthrene fused system which may be substituted with one or more alkyl, alkoxy, fluoro, phosphinic acid, phosphinate salt, fluoroalkyl, sulfonic acid, sulfonate salt, carboxylic acid, carboxylate salt, hydroxy, nitro, amino or cyano groups; and M is H+ or other metal or non-metal cation, with the proviso that at least one of M is H+ or is a moiety which can be thermally transformed into a proton under solution conditions.

10. A process according to claim 9 wherein said dopant is a sulfonic acid, a sulfonic acid derivative, or a combination thereof of the formula:

wherein;

c is 1, 2 or 3;

e is 0, 1 or 2;

$R_5$ is alkyl or alkyl substituted with one or more fluoro, or any two $R_5$ groups together may form an alkenylene chain completing a naphthalene fused system which may be substituted with one more sulfonic acid, sulfonic acid salt, alkoxy or alkyl; and M is a proton, or other metal or non-metal cation, with the proviso that at least one of M is a proton.

11. A process of forming an electrically conductive solid or liquid dispersion comprised of doped electrically conductive particles of a conjugated polymer dispersed in a liquid matrix or polymeric matrix, said process comprising the steps of selecting a liquid matrix or polymer matrix having a first solubility parameter;

doping particles of a conjugated polymer which is incompatible with said selected liquid matrix or polymer matrix to form electrically conductive particles comprising an ionized electrically conductive conjugated polymer (polymer cation) doped with one or more dopant solutes (anions), and where at least one dopant solute predominates at or near the surface of said particles modifying the solubility parameter, or equivalently the surface energy, of the conjugated polymer particle at or near the surface of said particle to enhance the compatibility of the surface of said particle with said selected liquid or polymer; and dispersing said particles in said selected liquid matrix or polymer matrix to form said liquid or solid dispersion.

12. A process according to claim 11 wherein at least a part of said dopant to be incorporated at or near the surface of said particles is first incorporated into said selected liquid or polymer matrix in the form of an acid, salt, or ester thereof.

13. A process according to claim 12 wherein said dopant is reacted and bonded at or near the surface of said particles during the process of dispersing said particles in said liquid or polymer matrix.

* * * * *